United States Patent [19]
Bratton et al.

[11] 3,772,147
[45] Nov. 13, 1973

[54] PRESSURIZED FUEL ELEMENTS FOR A NUCLEAR REACTOR

[75] Inventors: Raymond J. Bratton, Delmont; Elwyn Roberts, Penn Hills; Peter G. Smerd, Shadyside, all of Pa.

[73] Assignee: Westinghouse Electric Corporation, Pittsburgh, Pa.

[22] Filed: Oct. 27, 1970

[21] Appl. No.: 84,302

[52] U.S. Cl. .................................................. 176/68
[51] Int. Cl. ............................................... G21c 3/04
[58] Field of Search .................. 176/68, 81, 79, 72, 176/19

[56] References Cited
UNITED STATES PATENTS
| | | | |
|---|---|---|---|
| 3,197,381 | 7/1965 | Blake | 176/72 |
| 3,406,094 | 10/1968 | Beisswenger et al. | 176/79 |
| 3,350,271 | 10/1967 | Maidment et al. | 176/19 |
| 3,356,585 | 12/1967 | Zebroski | 176/68 |
| 3,519,537 | 7/1970 | Ferrari | 176/68 |
| 3,291,698 | 12/1966 | Fortescue | 176/68 |

*Primary Examiner*—Harvey E. Behrend
*Attorney*—A. T. Stratton and Z. L. Dermer

[57] ABSTRACT

An internally pressurized hermetically clad fuel element for a nuclear reactor having a normally sealed chamber within the fuel element plenum. The chamber is maintained at a lower pressure than the internal pressure of the fuel element and at least a portion of one of the chamber walls is formed from a permeable membrane material which allows the plenum gases to diffuse into the chamber at a rate comparable to the rate of fission gas release from the fuel during burn up.

7 Claims, 2 Drawing Figures

Patented Nov. 13, 1973

3,772,147

PRESSURIZED FUEL ELEMENTS FOR A NUCLEAR REACTOR

BACKGROUND OF THE INVENTION

This invention relates to fuel elements for nuclear reactors, and more particularly to internally pressurized, clad fuel elements having nuclear fuel contained therein which gives off fission gases during burn up.

Many designs of presently manufactured commerical nuclear reactors have their fuel inventory of fissile and fertile material contained within a plurality of elongated metallic clad fuel elements or fuel rods. The fuel rods comprise a tubular cladding member hermetically closed by a pair of end plugs. The fuel generally consists of juxtaposed ceramic pellets, of for example uranium dioxide, contained within the metallic cladding. The exterior of the cladding is exposed to a high temperature, high pressure environment. For example, in a pressurized water reactor, a fuel element will be exposed to a pressure in excess of 2,000 psi and a temperature above 500° F.

A recent innovation in fuel element manufacture has been to internally pressurize the fuel rods before insertion into the core of a nuclear reactor. This increase in the internal pressure of the fuel rods offsets the external pressure on the cladding walls in the reactor core and thereby reduces the stresses on the fuel cladding. The reduction in cladding stresses facilitates the manufacture of fuel elements with thinner walls which during reactor operation aids the escape of neutrons to other fuel rods, thus increasing the neutron economy and thereby reducing the cost of reactor operation.

During burn-up of the fissile fuel pellets, fission gases are released which increase the internal pressure within the fuel rods. Although internal pressurization greatly reduces the differential pressure across the cladding and thereby increases the reliability of such fuel rods, a problem is created after substantial burn-up due to the amount of fission gases which accumulate within such fuel rods. This buildup effects the internal and external pressure balance achieved by internal pressurization of the fuel rods, thus rendering the fuel rod cladding susceptible to rupture. Thus, in order to manufacture reliable fuel elements and particularly such fuel elements as are to be pre-pressurized during manufacture, some means must be provided for accommodating the fission gases released during burn-up. An example of such a pressurized fuel element with fission gas accommodating means may be found in U.S. Pat. application No. 738,237, filed June 19, 1968 by H. M. Ferrari, and assigned to the Westinghouse Electric Corporation.

Another solution to the above problem of fission gas accummulation may be found in U.S. Pat. application No. 752,299, filed Aug. 13, 1968, by H. N. Andrews et al., and assigned to the Westinghouse Electric Corporation. According to this latter application, one or more bellows-like members are provided within the interior of the fuel element, each having an internally mounted pin. As fission gases accummulate the various bellows are punctured providing additional void space for fission gas accummulation. However, in both of the above cited applications, a plot of the internal pressure versus time for such fuel rods shows a saw-tooth pattern with deeply decreasing pressure gradients at the predetermined points of intentional bellows failure or puncture. A cyclic difference pressure pattern is thereby produced on the cladding. It is possible that the sudden increase in differential pressure, as each bellows intentionally fials, might lead to reduced reliability of the fuel rods, especially where a cladding material having a relatively low modulus of elasticity is used. Unfortunately, materials such as zircaloy which are desirable for use as cladding in nuclear fuel elements because of their relatively low capture cross section with respect to thermal neutrons, generally have a low modulus of elasticity.

Another solution of the prior art may be found in U.S. Pat. application No. 802,544, filed Feb. 26, 1969, by H. M. Ferrari and M. B. L. Hepps and assigned to the Westinghouse Electric Corporation. Here it is suggested that a bellows-like member be internally supported within the plenum of a nuclear fuel element and communicably coupled with the environment of the fuel element so as to maintain an internal pressure substantially equal to the external pressure or environmental pressure during burn-up and load follow. The bellows-like member is preferably constructed of a material with a relatively high modulus of the elasticity so that it may readily expand or contract to compensate for the amount of fission gas released by the fuel during burn-up. While the latter arrangement is an improvement over the prior art, it has the disadvantage that, if the bellows should fail, coolant is exposed to the interior of the fuel element, alternately, the fission gases are released into the coolant.

SUMMARY OF THE INVENTION

A more reliable fuel element which is neither subject to a substantial pressure differential across its cladding nor to a varying pressure differential due to fission gas accummulation may be produced in accordance with this invention by providing an internally pressurized fuel element with an evacuated chamber positioned within the fuel element plenum. One wall of the chamber is constructed from a permeable membrane material that allows the plenum gases to diffuse into the chamber; thereby making the available volume for accommodating the released fission gases increase progressively with burn-up; and thus enabling the pressure in the plenum of the fuel element to be maintained approximately constant throughout life.

In order to maintain an approximately constant pressure in the fuel element, the membrane desirably is constructed from a material that enables the plenum gases to diffuse into the chamber at a rate comparable to the rate of fission gas release from the fuel.

BRIEF DESCRIPTION OF THE DRAWINGS

For a better understanding of this invention, reference may be had to the exemplary embodiment shown in the accompanying drawings, in which.

DESCRIPTION OF THE PREFERRED EMBODIMENT

Figures 1, 2:
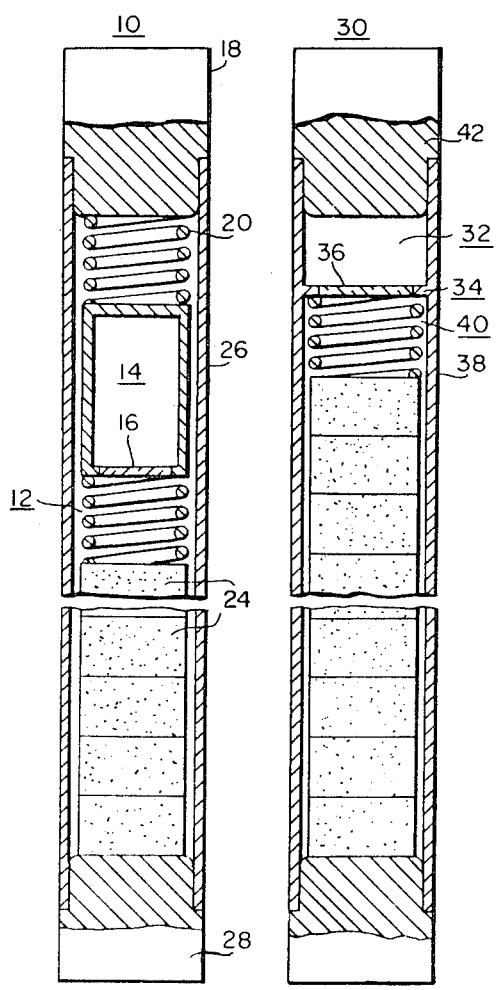
FIG. 1 is a sectional view of a fuel element representing one embodiment of this invention.
FIG. 2 is a sectional view of a fuel element representing another embodiment of this invention.

Referring now to the exemplary embodiment of this invention illustrated in FIG. 1, there is shown a clad nuclear fuel element 10 constructed in accordance with the principles of this invention which includes a tubular cladding member 26 closed at its ends by a pair of end plugs 18 and 28 hermetically secured to the cladding 26 by suitable means such as by welding. The fuel element 10 has a fuel free zone or gas plenum 12 normally located above the fuel pellets 24. The fuel pellets 24 are positioned in a tandem arrangement that extends longitudinally between the lower end plug 28 of fuel element 10 and the gas plenum 12. The fuel pellets 24 and gas plenum 12 are sealed within the fuel element cladding 26 formed from a suitable material such as zirconium alloy, and which extends longitudinally between the two end plugs 18 and 28. A container or chamber 14, having a permeable membrane 16 forming at least a portion of one of its walls is located within the plenum 12, and replaces in part the retaining spring 20, which functions to hold the pellets 24 compactly in place against the lower end plug 28. For a better understanding of the function and purpose of the retaining spring reference may be had to the H. M. Ferrari U.S. Pat. application No. 706,291, filed Feb. 19, 1968 and assigned to the Westinghouse Electric Corporation.

The object of this invention is to use a permeable membrane 16 that allows the plenum gases, comprising the prepressurizing gas when employed, and the fission gases, namely krypton and xenon which build up during fuel element operation, to leak out of the main compartment of the fuel element 12 and into the chamber 14 at a rate comparable to the rate of fission gas release from the fuel. It is desirable to have the prepressurizing gas diffuse through the membrane 16 at a rate comparable to that of both the fission gases, krypton and xenon. In this way, the partial pressures of krypton, xenon and the pressurizing gas will attempt to become balanced on either side of the membrane at the end of fuel element life and pressure control will result. Both krypton and xenon possess similar diffusion coefficients in solids and will diffuse through the membrane 16 at substantially comparable rates. However, neither of these gases be used as the prepressurizing gas because they both have a high absorption cross-section and therefore will absorb neutrons unproductively and hence remove them from the fission chain reaction in a reactor, decreasing its reactivity. In this embodiment, argon is a suitable example of the prepressurizing gas since this gas is plentiful, relatively inexpensive and has a diffusion rate comparable to that of krypton and xenon at normal reactor temperature Phys. stat. Sol. 32, K139 (1696) Subject classification: 1.2 and 9: 14.4:22.5.2, Hahn-Meitner Institut, Sektor Kernchemie, Berlin, *Rare Gas Diffusion In Neutron Irradiated CsCl and CsI*[1]. In contrast to the current reference pressurizing gas, helium, however, argon possesses a thermal conductivity of approximately one order of magnitude lower. Replacement of helium by argon, therefore, while being desirable for effective pressure control, will result in increased fuel temperature being attained during irradiation. It is estimated that for a linear heat rating in the fuel rod of 15 kw/ft, a rise in the centerline temperature of the fuel approximately 50° to 100° will occur. Such a temperature increase will have the effect of increasing further the quantity of fission gases released during irradiation making the requirement for pressure control even more important. By suitable design, however, such as by providing a chamber large enough to accommodate the additional fission gases released, this invention may be used in conjunction with an argon pressurizing gas with considerable advantage.

The selection of a suitable membrane depends upon an understanding of the diffusion of noble gases in permeable solids. The passage of a gas through a section of a homogeneous solid takes place in several steps: (a) absorption of the gas at the gas solid interface, (b) disassociation of the gas (if polyatomic) and solution in the solid, (c) bulk diffusion of the gas through the solid and (d) the reverse of (a) and (b) at the second surface. Of these steps, bulk diffusion is usually the slowest, and thus it is rate determining. The extent to which diffusion takes place is dependent upon the chemical nature of the gas and solid; and on the atomic dimensions of the gas in relation to the interatomic distances in the solid. For most solids the bulk diffusion rate of noble gases is exceedingly low due to the small interatomic spacing of the crystal lattice. For certain ionic solids such as CsCl, glasses such as borosilicate glass, clear fused silica, and soda-lime, and other ceramic bodies, however, the diffusion rate has been demonstrated to be high due to the open lattice of the vitreous phase. Therefore, such materials may be desirably used for the membrane material.

The diffusion rate will also be sensitive to the pressure gradient across the membrane, therefore, for design purposes this effect must also be considred in detail, since the pressure differential, and hence the diffusivity, will decrease progressively with burn-up.

In addition to being permeable to noble gases, fused silica has excellent thermal stability below 1,000° C, and is strong and chemically stable. However, under irradiation by fast neutrons the density and the embrittlement of fused silica is known to increase. This is not very significant at temperatures above 400°C where radiation damage in glass tends to anneal out. Even if the membrane shows considerable embrittlement during irradiation even better pressure control would be possible. Thus, for example, if the membrane fractured after a substantial burn-up (eg. 20,000 – 30,000 MWD/MTU) the entire container volume will become instantaneously available for containment of the fission gases.

It is to be understood that those substances specified as having an application in this invention were merely illustrative and not limitative. It is important to note that many potential substances for such application exist commercially and that techniques for producing molecular sieves in many substances are well established. It should also be understood that many techniques exist commercially for attaching the membrane 16 to the container 14. One such technique is to mold the container to the membrane.

Referring now to FIG. 2 it will be observed that another embodiment of this invention comprises an evacuated chamber 32 which is formed by sectioning off the upper portion of the fuel element plenum 40 with a partition 34. The membrane 36 forms a portion of this partition and enables the plenum gases to diffuse into the evacuated chamber 32. The side walls of the chamber are formed by the fuel element cladding 38 and the top of the chamber is enclosed by the fuel element end plug 42. In all other respects fuel element 30 is identical to fuel element 10.

It is to be understood that the plenum 40 may be sectioned off into more than one chamber 32 by providing additional partitions 34 at varying heights within the plenum 40. Since the rate of diffusion is dependent upon the ressure differential at the membrane interface varying degrees of pressure control can be obtained by utilizing more than one evacuated chamber. Even greater pressure control could be achieved by utilizing membranes with different diffusion rates at each partition.

We claim as our invention:

1. A clad nuclear fuel element comprising a hermetically sealed casing member impermeable to gas, solid nuclear fuel occupying a portion of the interior of said casing member and the remainder of said casing member forming a prepressurized, leak free, relatively non-deformeable, gas filled plenum in fluid communication with the fuel, at least one sealed chamber occupying at least a portion of said plenum, the interior of said chamber being initially at a pressure lower than the internal pressure of said plenum, diffusion means forming at least a portion of at least one wall of said chamber, said diffusion means being formed to provide said plenum gases access to the interior of said chamber at a predetermined diffusion rate substantially equal to fission gas release from the fuel so as to maintain a relatively constant pressure within said plenum during reactor operation.

2. The nuclear fuel element of claim 1 wherein said diffusion means comprises a permeable membrane which forms at least a portion of at least one wall of said chamber.

3. The nuclear fuel element of claim 2 wherein the filling gas in said plenum is selected so as to have a diffusion rate through said membrane comparable to that of krypton and xenon.

4. The nuclear fuel element of claim 3 whierein said filling gas is selected from the group consisting of argon, krypton, and xenon. release from the fuel.

5. The nuclear fuel element of claim 2 wherein said membrane is constructed from a material selected from the group consisting of borosilicate glass, clear fused silica, soda-lime, CsCl, and quartz.

6. The nuclear fuel element of claim 1 wherein said casing member forms the side walls of said sealed chamber.

7. The nuclear fuel element of claim 2 wherein said chamber comprises a sealed can and said membrane forms at least a portion of at least one wall of said can.

* * * * *